United States Patent
Li

(10) Patent No.: US 9,648,122 B2
(45) Date of Patent: *May 9, 2017

(54) MOBILE CACHE FOR DYNAMICALLY COMPOSING USER-SPECIFIC INFORMATION

(75) Inventor: Benjamin Bin Li, Concord, MA (US)

(73) Assignee: TAMIRAS PER PTE. LTD., LLC, Dover, DE (US)

( * ) Notice: Subject to any disclaimer, the term of this patent is extended or adjusted under 35 U.S.C. 154(b) by 1276 days.

This patent is subject to a terminal disclaimer.

(21) Appl. No.: 11/133,755

(22) Filed: May 19, 2005

(65) Prior Publication Data

US 2005/0210125 A1 Sep. 22, 2005

Related U.S. Application Data

(63) Continuation of application No. 09/684,047, filed on Oct. 6, 2000, now Pat. No. 6,901,437.

(51) Int. Cl.
*G06F 15/16* (2006.01)
*H04L 29/08* (2006.01)

(52) U.S. Cl.
CPC .......... *H04L 67/2823* (2013.01); *H04L 67/04* (2013.01); *H04L 67/2842* (2013.01); *H04L 67/306* (2013.01)

(58) Field of Classification Search
CPC . H04L 67/2823; H04L 67/2842; H04L 67/04; H04L 67/306
USPC ................. 709/201–203, 216–219
See application file for complete search history.

(56) References Cited

U.S. PATENT DOCUMENTS

| 5,978,828 | A | 11/1999 | Greer et al. |
| 6,061,678 | A | 5/2000 | Klien et al. |
| 6,173,331 | B1 * | 1/2001 | Shimonishi ................... 709/232 |
| 6,219,676 | B1 | 4/2001 | Reiner |
| 6,298,356 | B1 | 10/2001 | Jawahar et al. |
| 6,345,279 | B1 * | 2/2002 | Li et al. ..................... 707/104.1 |
| 6,421,733 | B1 | 7/2002 | Tso et al. |
| 6,442,549 | B1 * | 8/2002 | Schneider |
| 6,473,609 | B1 | 10/2002 | Schwartz et al. |
| 6,526,580 | B2 | 2/2003 | Shimomura et al. |
| 6,549,898 | B1 * | 4/2003 | Inaba et al. ................... 715/255 |
| 6,564,251 | B2 * | 5/2003 | Katariya et al. .............. 709/214 |
| 6,854,120 | B1 * | 2/2005 | Lo et al. ....................... 719/311 |

(Continued)

OTHER PUBLICATIONS

Final Rejection on U.S. Appl. No. 09/684,047, mailed Jan. 5, 2004.

(Continued)

*Primary Examiner* — Abdullahi E Salad

(57) ABSTRACT

A system and method for caching data in wireless application protocol (WAP) enabled services caches static data and facilitates dynamic creation of user-specific information to provide a customized output. The mobile cache generates the user-specific information in WML in real-time from cached information according to user-specified preferences. A change trigger triggers information delivery after a predetermined amount of cached information changes. The system may also include an image converter to ensure that image objects can be viewed easily on WAP-enabled devices having small display screens and a document converter to dynamically compose information from selected data based on XML-based content tagging.

13 Claims, 1 Drawing Sheet

(56) References Cited

U.S. PATENT DOCUMENTS

| | | |
|---|---|---|
| 2001/0020242 A1 | 9/2001 | Gupta et al. |
| 2001/0051927 A1 | 12/2001 | London et al. |
| 2001/0054087 A1 | 12/2001 | Flom et al. |
| 2002/0052824 A1 | 5/2002 | Mahanti et al. |
| 2002/0054090 A1 | 5/2002 | Silva et al. |
| 2002/0112014 A1 | 8/2002 | Bennett et al. |

OTHER PUBLICATIONS

Non-Final Office Action on U.S. Appl. No. 09/684,047, mailed Jul. 14, 2003.
Non-Final Office Action on U.S. Appl. No. 09/684,047, mailed Jun. 18, 2004.
Notice of Allowance on U.S. Appl. No. 09/684,047, mailed Jan. 26, 2005.

\* cited by examiner

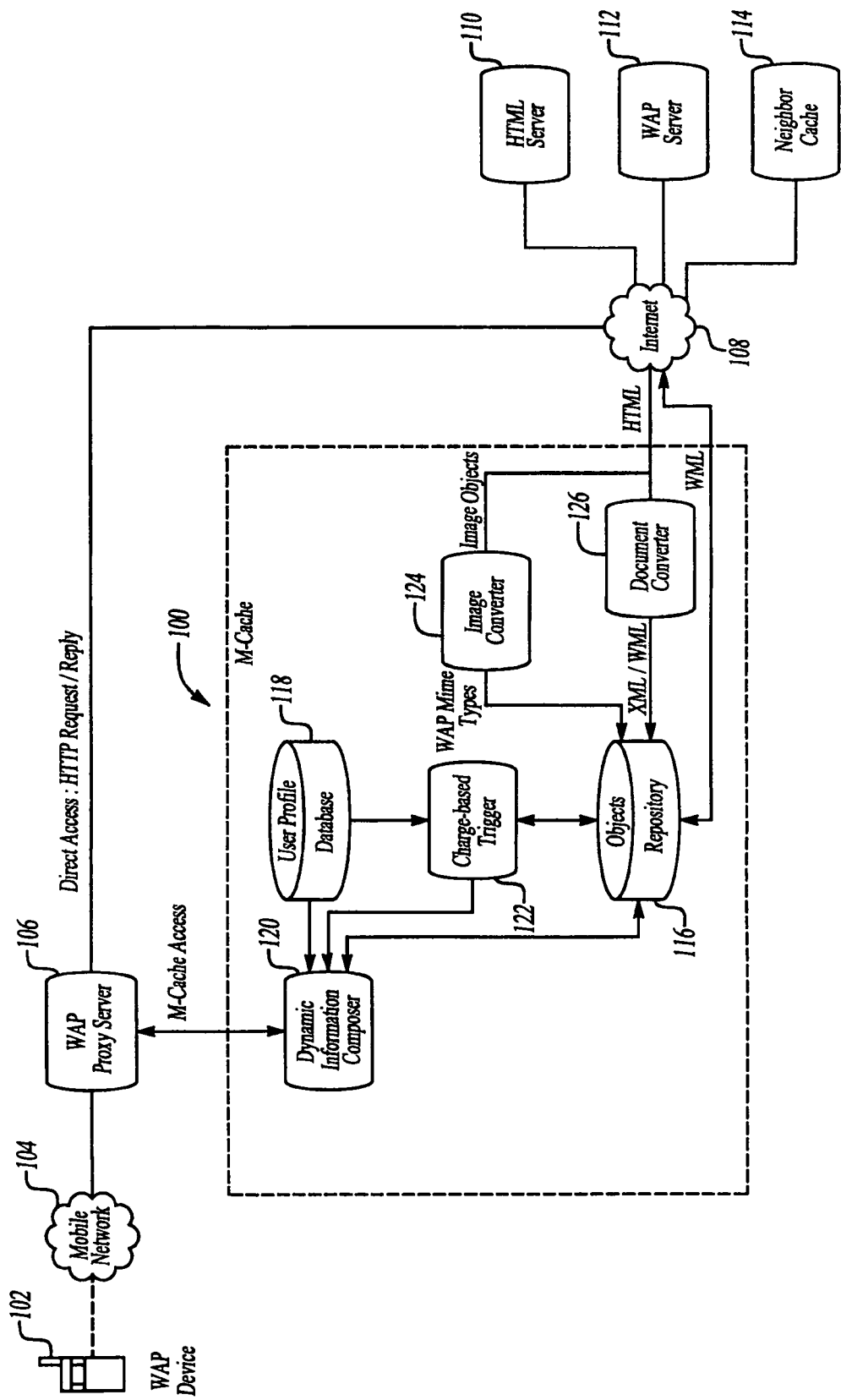

MOBILE CACHE FOR DYNAMICALLY COMPOSING USER-SPECIFIC INFORMATION

CROSS-REFERENCE TO RELATED APPLICATIONS

This is a continuation of prior co-pending U.S. patent application Ser. No. 09/684,047, filed Oct. 6, 2000, now U.S. Pat. No. 6,901,437 titled "MOBILE CACHE FOR DYNAMICALLY COMPOSING USER-SPECIFIC INFORMATION."

TECHNICAL FIELD

The present invention relates to caching, and more particularly to a cache that handles both static and dynamic data.

BACKGROUND OF THE INVENTION

Wireless Application Protocol ("WAP") enabled services are currently becoming more popular as more users incorporate wireless devices into their daily lives. As is known in the art, WAP is a standardized way for wireless devices (e.g. portable phones, hand-held devices) to communicate with each other and to access the Internet.

Caches are widely used in many applications to improve processing speed by providing a location for temporary data storage. For example, the cache can store recently accessed Web pages so that, when the user later returns to the Web page, the browser obtains the Web page information locally from the cache rather than from the origin server. The information from the cache reaches the user faster and also relieves the network from the burden of the additional traffic that would have occurred if the Web page information had to be re-transmitted to the wireless device.

Currently known-caching schemes in wireless applications, however, can deal only with static data and cannot generate any information according to user-specified parameters. As a result, there are no known ways of providing personalized information delivery with existing cache systems.

There is a need for a cache system that is not limited to handling static data and that can handle and generate dynamic user-specific information.

SUMMARY OF THE INVENTION

Accordingly, the present invention is directed to a mobile cache system and method for Wireless Application Protocol ("WAP") enabled services. The inventive mobile cache system not only can cache static data, but also can share processing functions with origin Web servers and facilitate dynamic creation of user-specific information.

A mobile cache server according to the invention obtains a user profile, which contains preference data with respect to output content and layout, looks for user-requested information in an object database, fetches and caches the information from an origin server if the information is not already in the object database, and composes user-specific information according to the preference data.

As a result, the inventive system and method caches static data like known caches but also shares data processing functions with origin Web servers and allows dynamic creation of user-customized information. By dynamically generating information as well as caching static pages, the invention reduces traffic burden on the original server while providing users with personalized, user-specified information service.

BRIEF DESCRIPTION OF THE DRAWING

FIG. 1 is a schematic diagram of a mobile cache system architecture incorporating one embodiment of the present invention.

DETAILED DESCRIPTION OF THE PREFERRED EMBODIMENT

FIG. 1 is a representative diagram of a mobile cache system architecture incorporating the mobile cache of the present invention. As indicated in the FIGURE, the mobile cache 100 is particularly suited to a system using Wireless Application Protocol ("WAP") enabled services and is designed to improve the experience of wireless device (e.g. wireless phones, hand-held devices) users during Internet access. As can be seen in the FIGURE, a wireless device 102 couples to the mobile cache 100 via a mobile network 104 connected to a WAP proxy server 106. The WAP proxy server 106 is connected to the mobile cache 100 and directly to the Internet 108, which include Hypertext Markup Language ("HTML") servers 110, WAP servers 112, and/or neighbor caches 114. The term "origin server" will be used in this application to refer to any location from which the mobile cache 100 obtains its original data, such as the Internet 108.

The mobile cache 100 itself preferably includes an object repository or database 116 that caches selected data from the origin server, such as recently accessed Web pages. The mobile cache 100 also includes a user profile database 118 and a dynamic information composer 120. The user profile database 118 stores one or more user profiles that contain output preference data. The output preference data may include data specifying the content and layout of the information fetched from the object database 116 when it is delivered to the user via the wireless device 102. When the mobile cache 100 receives a user request for specific information from the Internet 108, it first looks to the user profile database 118 to obtain the user profile associated with the user making the request. If the user's profile is not available in the database 118, the mobile cache 110 may either display the fetched information using standardized content and formatting or request additional information from the user to generate a new user profile to be stored in the user profile database 118.

Once the mobile cache 100 receives a user request and obtains the user profile from the user profile database 118, the mobile cache server looks for the requested information in the object database 116. If all of the requested information is located in the object database 116, the dynamic information composer 120 uses the requested information to compose user-specific information according to the user's preferences with respect to content and layout. The information is preferably composed in Wireless Markup Language ("WML") in real time. The user-specific information is then outputted-to the wireless device 102 for the user's consideration.

If the object database does not contain all of the requested information and if the missing information is not available in local or neighbor caches, the mobile cache 100 will declare a cache miss and pass the user request to the origin server so that the information can be fetched from the origin server (e.g., the Internet 108) and then stored in the object database 116. The dynamic information composer 120 then composes the user-specific information in the manner explained above, according to the user's preferences with respect to content and layout specified in the user profile. As the dynamic information composer 120 generates the user-specific information and caches static pages, the mobile cache 100 may locally maintain logs that can be appended to log files of origin servers.

As can be seen in FIG. 1, the mobile cache 100 may also include a change-based trigger 122 that monitors information changes in the object database 116 and triggers information delivery, according to user preferences, when the amount of changed information reaches a predetermined threshold. This monitoring and triggering preferably occurs even while the dynamic information composer 120 is composing user-specific information.

The mobile cache 100 according to the present invention also may include an image converter 124 and/or a document converter 126. The image converter 124 can be used alone if the mobile cache 100 is constructed to function in its simplest mode. Caching image objects improves performance by saving a great deal of network bandwidth. Because the small screens in wireless devices, such as phones and hand-held devices, have difficulty rendering the image objects that are often attached to HTML files, the image converter 124 converts the image objects so that they can be viewed by WAP-enabled devices before they are cached into the object database 116.

The document converter 126 can be included to create an advanced operating mode for the mobile cache 100 by being able to extract data segments from single or multiple Web pages to provide further dynamic information composition capability. The document converter 126 takes advantage of XML-based content tagging by converting the HTML files obtained from the origin server into Extensible Markup Language ("XML") files and storing them in the object database. The XML files, including their content-based tags, can then be queried by the mobile cache-server based on the user's information request so that selected data segments from the XML files can be used to dynamically compose the user-specific information. By taking advantage of the XML-based content tags, the mobile cache 100 can customize the user-specific data at an additional level of detail. Of course, if the data from the origin server is already a WML file, the WML file can be transmitted directly for storage in the object database 116 without first passing through the image converter 124 or the document converter 126.

Thus, the inventive mobile cache system is particularly suited for wireless application protocol (WAP) services and can be incorporated for use with WAP proxy or Web servers. Caching satisfies user information requests without having to access the origin server, reducing network bandwidth and reducing traffic load on origin servers. Further, by combining caching with dynamic information composition/transformation and providing the option of converting existing HTML applications for use on WAP-enabled services, the inventive mobile cache system can provide personalized WAP service and improved network and server performance at the same time.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system, comprising:
a user profile database that stores at least one user profile containing output preference data with respect to at least one of output content and output layout for a user of a mobile device;
an object database for storing selected data from an origin server;
a document converter coupled to the object database for converting the selected data from an HTML file into an XML file and storing the XML file in the object database;
a dynamic information composer coupled to the object database and the user profile database, wherein the dynamic information composer dynamically composes user-specific information as a personalized, user-specific output based on segments of data from more than one XML file in the object database and the user profile; and
a processor configured to monitor information changes in the object database and to trigger an output delivery to the mobile device if a number of information changes in the object database reaches a predetermined threshold, wherein the processor is configured to monitor the information changes to trigger the output delivery while the dynamic information composer dynamically composes the user-specific information in real time,
wherein composing user-specific information in real time includes using content-based tags and the output preference data to determine data segments of the XML file to include in the user-specific information.

2. The system of claim 1, further comprising a user profile generator coupled with the user profile database to generate a new user profile.

3. The system of claim 1, wherein the dynamic information composer composes the user-specific information in WML.

4. The system of claim 1, further comprising an image converter coupled to the object database, the image converter configured to convert an image format of the selected data from the origin server to an alternate image format based on the output preference data, wherein the object database stores the selected data in the object database after image format conversion.

5. The system of claim 1, wherein the document converter extracts the data segments of the selected data from the origin server based on the output preference data.

6. The system of claim 1, wherein the processor is configured to generate a log of at least the user-specific information.

7. The system of claim 6, wherein the processor is configured to append the log to a log file of the origin server.

8. A method, comprising:
storing a user profile for a user of a wireless device at a mobile cache server remotely located from the wireless device and in communication with the wireless device by way of a wireless network, wherein the user profile contains output preference data with respect to at least one of output content and output layout;
receiving at the mobile cache server a first request for requested information from the wireless device;
sending the first request to an origin server associated with the first request and remote from the mobile cache server and wireless device;
receiving at the mobile cache server the requested information from the origin server, the requested information having a first format;

converting at the mobile cache server at least a portion of the requested information from the first format to a second format different than the first format, including the conversion of HTML content to an XML, file having content-based tags;

storing the converted requested information in a database of the mobile cache server;

composing first user-specific information in real time at the mobile cache server from segments of data from more than one XML file in the object database, based on the output preference data, including using the content-based tags and the output preference data to determine the data segments of the XML files to include in the first user-specific information;

sending the first user-specific information from the mobile cache server to the wireless device;

monitoring information changes in an object database associated with the origin server while the user-specific information is being composed; and triggering an output delivery to the wireless device if a number of information changes in the object database reaches a predetermined threshold.

9. The method of claim 8, further comprising:

receiving at the mobile cache server a second request for the requested information from the wireless device;

retrieving the converted requested information from the database without contacting the origin server;

composing second user-specific information at the mobile cache server from the converted requested information, based on the output preference data; and sending the second user-specific information from the mobile cache server to the wireless device.

10. The method of claim 8, wherein the requested information includes an image, and wherein converting the requested information includes converting the image from the first format to the second format.

11. A non-transitory computer readable medium having instructions stored thereon for execution by a processor, the instructions comprising:

instructions to store a user profile for a user of a wireless device at a mobile cache server remotely located from the wireless device and in communication with the wireless device by way of a wireless network, wherein the user profile contains output preference data with respect to at least one of output content and output layout;

instructions to receive a first request for requested information from the wireless device;

instructions to send the first request to an origin server associated with the first request and remote from the mobile cache server and the wireless device;

instructions to receive the requested information from the origin server, the requested information having a first format;

instructions to convert at least a portion of the requested information from the first format to a second format different than the first format, including the conversion of HTML content to an XML, file having content-based tags;

instructions to store the converted requested information in a database of the mobile cache server;

instructions to compose first user-specific information in real time from segments of data from more than one XML file in the object database, based on the output preference data including using the content-based tags and the output preference data to determine the data segments of the XML files to include in the first user-specific information;

instructions to send the first user-specific information to the wireless device;

instructions to monitor information changes in an object database associated with the origin server while the first user-specific information is being composed; and instructions to trigger an output delivery to the wireless device if a number of information changes in the object database reaches a predetermined threshold.

12. A system, comprising:

a mobile cache that includes a user profile database that stores at least one user profile containing output preference data with respect to at least one of output content and output layout and corresponding to a mobile device, an object database that stores requested data received from an origin server remote from the mobile cache and the mobile device, and a dynamic information composer coupled to the object database and the user profile database;

wherein the mobile cache receives a request for the requested data from the mobile device, retrieves the user profile corresponding to the mobile device, determines that the requested data is not stored in the object database, receives the requested data from the origin server in a first format, converts at least a portion of the requested data from the first format to a second format including the conversion of HTML content to an XML file having content-based tags, stores the converted requested data in the object database, uses the dynamic information composer to compose user-specific information in real time using segments of data from more than one XML file in the object database based on the output preference data, including using the content-based tags and output preference data to determine the segments of the XML files to include in the user-specific information;

sends the user-specific information to the mobile device;

monitors information changes in the object database while the user-specific information is being composed; and triggers an output delivery to the mobile device if a number of information changes in the object database reaches a predetermined threshold.

13. The system of claim 12, wherein the requested data includes image data.

* * * * *